Oct. 27, 1970 J. R. JOHNSON 3,536,994

DROPOUT COUNTER WITH CONTINUOUS INTEGRATION AND MOVING COUNTING PERIOD

Filed March 28, 1968 2 Sheets-Sheet 1

INVENTOR:
James R. Johnson

By Smyth, Roston & Pavitt
ATTORNEYS

INVENTOR
James R. Johnson
By Smyth, Roston & Pavitt
ATTORNEYS

United States Patent Office 3,536,994
Patented Oct. 27, 1970

3,536,994

DROPOUT COUNTER WITH CONTINUOUS INTEGRATION AND MOVING COUNTING PERIOD

James R. Johnson, Dassel Township, Meeker County, Minn., assignor to Minnesota Mining and Manufacturing Company, St. Paul, Minn., a corporation of Delaware Filed Mar. 28, 1968, Ser. No. 716,754
Int. Cl. G01r 33/12
U.S. Cl. 324—34 15 Claims

ABSTRACT OF THE DISCLOSURE

The present invention is directed to a dropout counter that produces an output indication from dropout pulses occurring in an information signal reproduced from a recording medium. The dropout pulses are used to derive intermediate pulses, each having uniform amplitude and duration, and the intermediate pulses are integrated by an integrating means such as a capacitive circuit so as to produce a variable charge on the integrating means, which charge is increased by a predetermined charge in response to each of the intermediate pulses and which variable charge is dissipated over a discharge time interval and wherein the integrating means is capable of discharging from a maximum charge level to a minimum charge level over a time interval equal to a predetermined unit time. The variable charge level may then be recorded on a graphic member so as to produce a permanent record. Specifically, the variable charge represents as an average number the dropouts occurring in the unit time.

Figure 1:
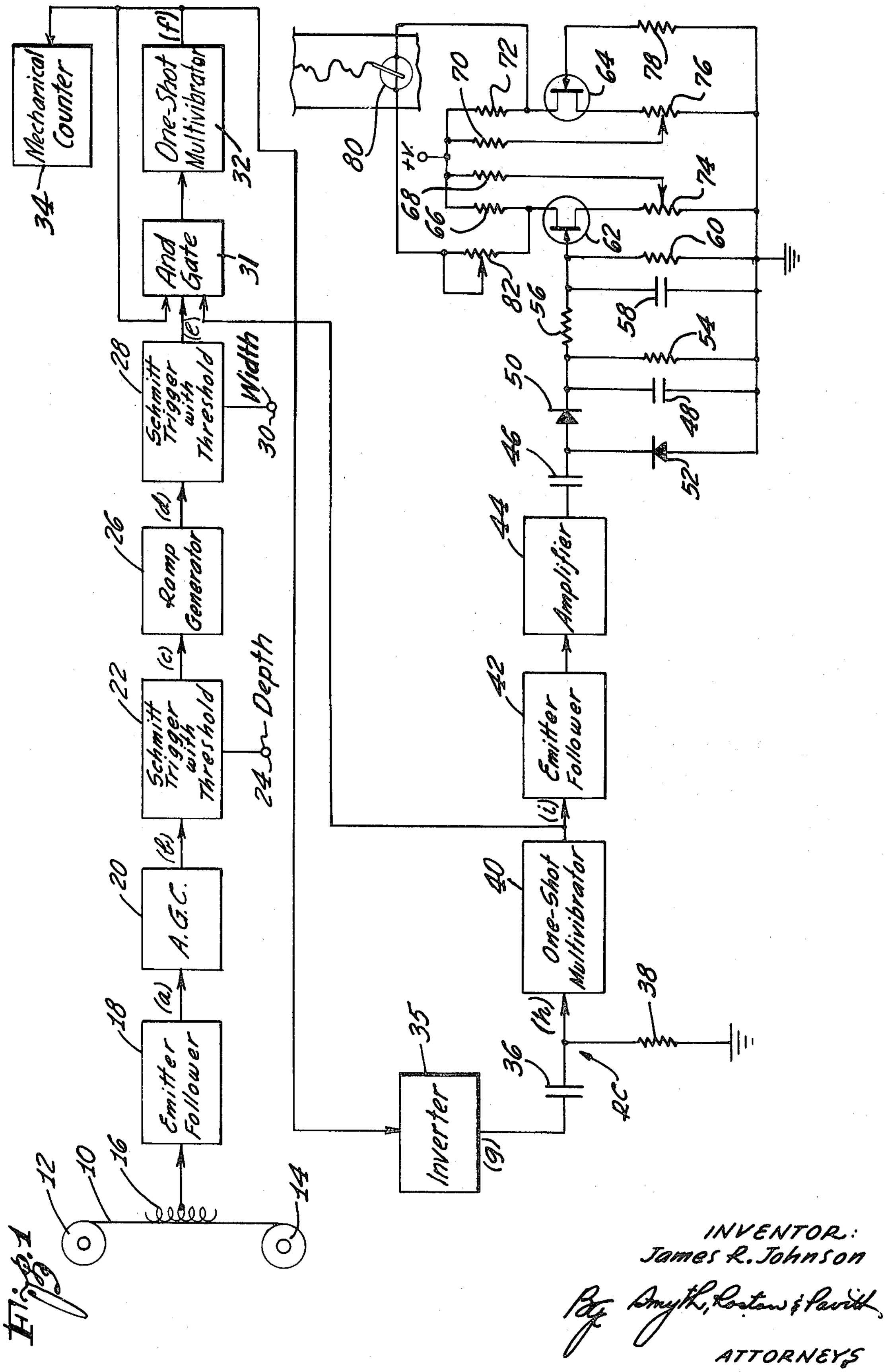

A common method of storing information such as television information is to record the video signals comprising the television information on a recording medium such as a magnetic tape. The magnetic tape may then be replayed at a later time so as to reproduce the video information. The video signal is usually frequency modulated before it is recorded on the magnetic tape. After reproduction of the frequency modulated video signal, the signal is demodulated so as to reproduce the video information.

One problem which has arisen during the reproduction of the recorded frequency modulated video signal from the magnetic tape is dropouts which occur in the reproduced video signal. A dropout in the video signal during reproduction can result from many different causes. One major cause for the production of dropouts is due to imperfections in the recording medium such as the magnetic tape. For example, scratches, craters, protrusions, etc., may each cause a momentary loss of signal or dropout, or foreign particles on the tape such as dirt or dust may become imbedded in the tape and also result in a momentary loss of signal.

The momentary loss of the signal results in a spot or streak which appears on the face of the television tube during reproduction. The spot or streak is annoying to a television viewer, especially if the dropouts occur frequently. It is, therefore, desirable to be able to evaluate video tape prior to the reproduction of information or prior to the use of the video tape for the recording of information so as to discard video tape when the dropout rate increases above a predetermined level. Also, if the video tape can be evaluated, it may be possible to remove portions of the video tape which have high dropout rates so that a major portion of the tape is still useable.

The present invention may, therefore, be used to evaluate video tape to determine the rate of dropouts occurring in information signals recorded on the video tape. The dropout counter of the present invention may be used to evaluate video tape which has been previously recorded or the dropout counter may be used to evaluate new video tape merely by recording a test signal and reproducing that test signal so as to determine the number of dropouts in the test signal.

The dropout counter of the present invention not only counts the number of dropouts but also records as a permanent record an output indication representing as an average number the dropout pulses occurring in a unit time from the video signals recorded on the magnetic tape. Specifically, this recording as an average number is instantaneous and continuous so that an accurate profile of the quality of the video tape may be shown by reviewing the permanent record. Also, since the recording is on an instantaneous and continuous basis, the output record is reproduceable.

The present invention provides for the measurement of the average number of dropout pulses occurring in a predetermined unit time by reproducing the information contained on the recording member to thereby reproduce any dropout pulses occurring within the information signal. Intermediate pulses are derived from the dropout pulses wherein the intermediate pulses each have a uniform amplitude and duration. Since not all dropout pulses cause visible distortions of the television picture, the intermediate pulses are only produced for dropouts which represent a signal loss greater than a predetermined level and also for dropouts which last longer than a predetermined duration.

The intermediate pulses which are produced are then coupled to an integrating means such as a capacitive circuit so as to produce a variable charge, which charge is increased in response to each of the intermediate pulses and wherein the integrating means has a discharging circuit which is capable of discharging the integrating means from a maximum charge level to a minimum charge level in a time interval which is equal to the predetermined unit time. Since the predetermined unit time is chosen to be approximately one minute, the dropout rate which is represented by the variable charge is represented as an average number of dropouts per minute. Because of the use of a minute for the unit time and since the unit time is continually shifted as the dropouts are detected, the present invention is referred to as a moving minute dropout counter. The variable charge on the integrating means may then be used to produce an output record on a recording member such as a chart recorder so that a permanent record representing the average number of dropout pulses occurring in the unit time is permanently recorded.

The present invention may be seen in greater detail with reference to the following description and drawings wherein:

FIG. 1 illustrates a circuit partially in block and partially in schematic form illustrating a dropout counter of the present invention; and FIG. 2(*a*)–2(*i*) are a series of curves illustrating the operation of the circuit of FIG. 1.

Figures 2A, 2B, 2C, 2D, 2E, 2F, 2G, 2H, 2I:
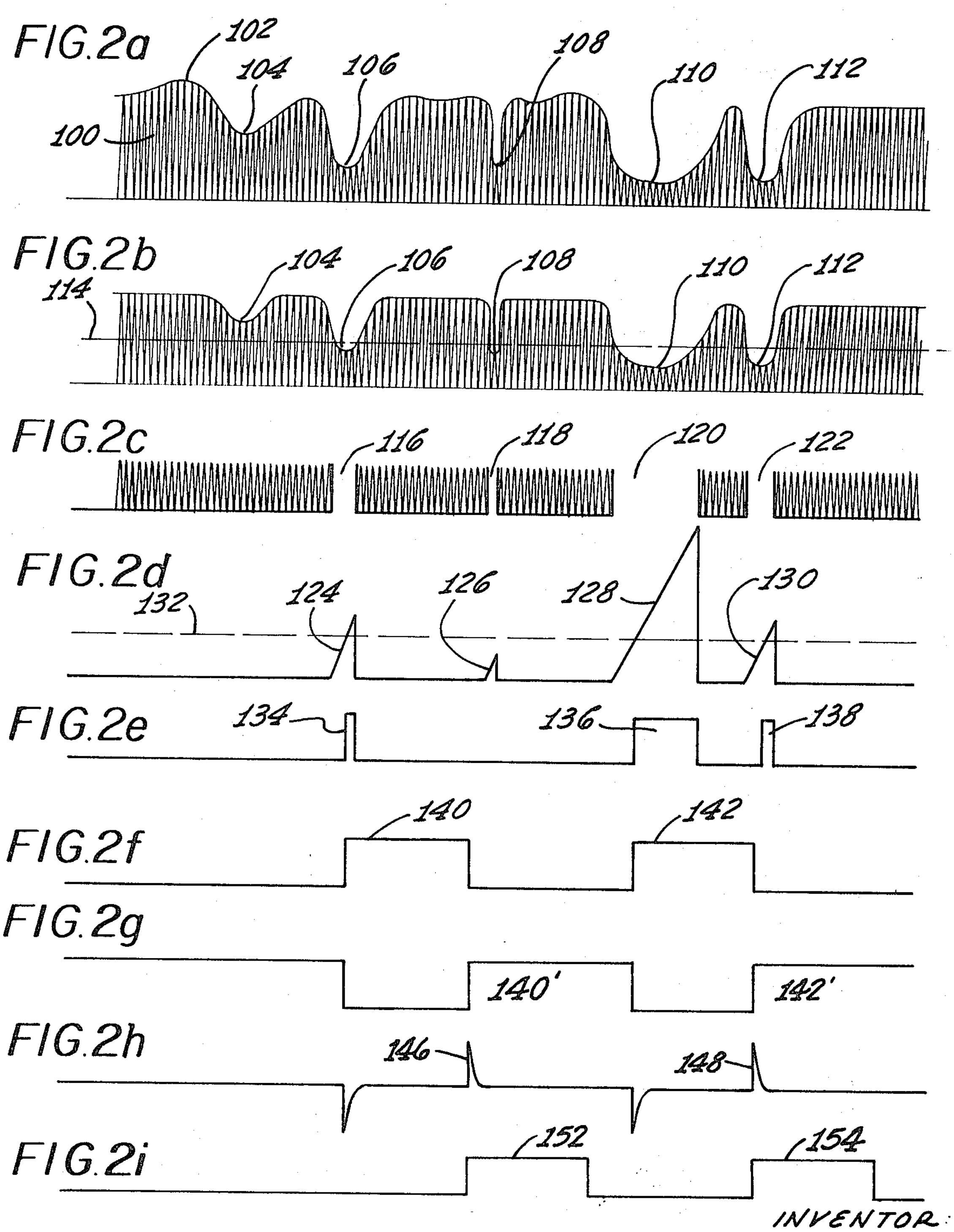

In FIG. 1, a magnetic tape 10 is transported between a pair of reels 12 and 14. A reproducing head 16 reproduces the information on the magnetic tape 10. Generally, video information which is recorded on magnetic tape is frequency modulated, so the reproduced video signals produced by the reproducing head 16 would be frequency modulated video signals. The frequency modulated video signals are coupled through an omitter-follower circuit 18 to have the general appearance shown in FIG. 2*a*. Specifically, as shown in FIG. 2*a*, the frequency modulated video signal 100 has an envelope 102. It is to be appreciated that the signal may actually be balanced so as to have a mirror image to that shown in FIG. 2*a* but merely the positive half of the signal is shown for convenience.

The amplitude of the envelope 102 varies and at locations such as 104 through 112 losses of signal may be referred to as dropouts. Whether these dropouts actually produce a visible loss of signal in the picture is determined upon the level of the loss of signal and the duration of the dropout. For example, dropout 104 is relatively shallow and may not be a sufficient loss of signal to produce a visible distortion of the picture. Also, dropout 108 is relatively short in duration and again may not produce a visible distortion. Specifically, the dropout counter of the present invention is designed so as to require a signal dropout of in the range of 12 db to 20 db signal loss with a 5-microsecond duration before the dropout is to be detected and counted. In this embodiment, a 50-millisecond interval is required between each dropout in order to record dropouts on a mechanical counter. When a 50-millisecond interval is selected between dropouts, dropouts closer together than 50 milliseconds would not be detected and would appear to be a group of closely spaced dropouts.

Since the output signal from the emitter-follower, which is the reproduced video signal, has variations in its envelope 102, which variations are not related to dropouts, an AGC circuit 20 is included so as to stabilize the amplitude of the envelope for relatively slow changes while allowing the rapid dropout changes to be included in the output signal. For example, FIG. 2*b* illustrates the output signal from the AGC circuit 20 and, as shown in FIG. 2*b*, the amplitude of the envelope of the frequency modulated video signal is maintained relatively constant with the exception of the large variations which represent dropouts. Therefore, the dropouts 104 through 112 are still included in the signal from the AGC circuit 20.

The output from the AGC circuit is applied to a Schmitt trigger circuit of the type which is activated when the amplitude of the frequency modulated video signal is above a predetermined threshold value. Specifically, as shown in FIG. 2, a threshold value shown by the dotted line 114 is continually exceeded on each cycle of the frequency modulated video signal causing the Schmitt trigger to actuate on each cycle unless dropouts are incurred which reflect a loss of signal which is less than the threshold value 114. When the amplitude of the frequency modulated video signal exceeds threshold value 114, the Schmitt trigger 22 produces a pulse train having a frequency equal to the frequency of the carrier signal. On the other hand, when the amplitude of the frequency modulated video signal is less than the threshold value 114, reflecting a loss of signal or a dropout, the Schmitt trigger 22 is disabled terminating its pulse train resulting in a short duration of no pulses. The duration of no pulses from the Schmitt trigger 22 is determined by the length of time the amplitude of the frequency modulated signal is below the threshold value 114. Specifically, the output of the Schmitt trigger is shown in FIG. 2*c* and, as can be seen, the short duration during which no pulses are produced by the Schmitt trigger is shown as interruptions of the pulse trains 116 through 122. Interruption 116 represents the dropout 106, interruption 118 represents the dropout 108, interruption 120 represents the dropout 110, and interruption 122 represents the dropout 112. There is no interruption representing the dropout 104, since the dropout 104 does not represent a signal loss below the threshold value 114. The Schmitt trigger 22 may include a depth control 24 so as to adjust the threshold value 114. As indicated above, a particular example of the invention requires the dropout to be between about 12 db to 20 db below the average signal before the dropout is detected, and the depth control 24 may be so adjusted.

The output or pulse train from the Schmitt trigger 22 is applied to a ramp generator 26 to produce a plurality of ramp signals as shown in FIG. 2*d*. In FIG. 2*d*, it can be seen that ramp signals 124 through 130 are produced in accordance with the interruption signals 116 through 122 shown in FIG. 2*c*. Specifically, each pulse of the pulse train from the Schmitt trigger 22 resets the ramp generator 26. In this manner, the amplitude of a ramp signal from the ramp signal generator 26 is a function of the time interval between pulses in the pulse train from Schmitt trigger 22. Thus, the amplitude of ramp signals 124 through 130 is determined by the length of interruptions 116 through 122 in the pulse train of FIG. 2*c* from the Schmitt trigger 22.

The output from the ramp generator 26 is applied to a second Schmitt trigger 28 which is only activated when the amplitude of the ramp signals 124 through 130 exceeds a certain minimum level. Specifically, the Schmitt trigger 28 operates only when its input signal is above the threshold value as shown by the dotted line 132.

Output pulses are produced from the Schmitt trigger 28 as shown in FIG. 2*e*, and specifically output pulses 134, 136 and 138 are produced. These output pulses correspond to the signals from the ramp generator above the threshold value 132, specifically signals 124, 128 and 130. It is to be noted that the ramp signal 126 does not produce an output pulse from the Schmitt trigger 28 since the amplitude of the ramp signal 126 is not greater than the threshold value 132. The Schmitt trigger 28, therefore, discriminates against dropout pulses which are less than a certain width, since the amplitude of the ramp signal is in accordance with the width of the dropout pulses. A width control 30 may be included so as to adjust the threshold in accordance with the desired minimum width for the dropout. As indicated above, the width may be chosen to have a value of approximately 5 microseconds.

The output from the Schmitt trigger 28 is used as one of three inputs to an AND gate 31. The output of the AND gate 31 is connected to a one-shot multivibrator 32. AND gate 31, when enabled, applies only output pulses 134 and 136 from the Schmitt trigger 28 to the one-shot multivibrator 32. The other two inputs to the AND gate 31 include the output of the one-shot multivibrator 32 and of a second one-shot multivibrator 40 (which will be described hereinafter). When both one-shot multivibrators 32 and 40 are in their stable state, AND gate 31 is conditioned and is able to pass the output pulse from the Schmitt trigger 28 to the one-shot multivibrator 32. However, if either one-shot multivibrator 32 or one-shot multivibrator 40 is in an astable state, AND gate 31 is disabled or inhibited and will not pass an output pulse from the Schmitt trigger 28.

The one-slot multivibrator 32 upon being triggered by an output pulse from Schmitt trigger 28 via AND gate 31 produces the output pulse signals 140 and 142, each having an equal duration and amplitude, as shown in FIG. 2*f*. Pulse 140 will be produced in response to pulse 134 from the Schmitt trigger 28 and output pulse 142 will be produced in response to output pulse 136. Output pulse 138 from the Schmitt trigger 28 which occurs a short time after pulse 136 will not be passed by AND gate 31 to the one-shot multivibrator 32 in that the AND gate 31 is disabled for a total period of 50 milliseconds after pulse 136. In this embodiment, the 50 milliseconds is selected as the lock-out time in order to register dropouts on a mechanical counter 34. The time interval between the leading edge of each pulse 140 and 142 is equal to the time interval between dropouts. The dropouts represented by pulses 140 and 142 occurring in the output signal 100 shown in FIG. 2*a* must exceed the selected time duration and signal loss and must occur at intervals of greater than 50 milliseconds.

The output from the one-shot multivibrator 32 is coupled via necessary circuitry (not shown) to a mechanical counter 34 to provide an output indication of the absolute number of dropouts which come within the definition of the dropout as to signal loss, duration of dropout and separation between dropouts. The counter 34, therefore, detects the absolute number of dropouts, within the established definition, for the entire length of magnetic tape which is being produced.

The output from the one-shot multivibrator 32 is applied to an inverter 35 which inverts the pulses 140 and 142 to pulses 140' and 142' having an opposite polarity as illustrated in FIG. 2*g*. The inverted pulses 140' and 142' are applied across an RC time constant circuit including capacitor 36 and resistor 38. The output across the resistor 38 is as shown in FIG. 2*h*, and as can be seen, the application of the inverted pulses 140' and 142' from the one-shot multivibrator 32 immediately causes the voltage to rise across the resistor 38 and then to fall back to zero so as to produce differentiated pulse signals 146 and 148. The negative going portions of the differentiated pulses are derived from the leading edges of pulses 140' and 142' and the positive going portions of the differentiated pulses are derived from the trailing edges of pulses 140' and 142'. In this embodiment, the negative going portions of the differentiated pulses 146 and 148 are not utilized and may be ignored. The positive going portions of the differentiated pulses 146 and 148 are used to activate the one-shot multivibrator 40.

The output of the one-shot multivibrator 40 is applied as one of the three inputs to AND gate 31. Since both one-shot multivibrators 32 and 40 have a 25-millisecond ON time or pulse length, the AND gate 31 is inhibited for a total time period of 50 milliseconds. One-shot multivibrator 40 is responsive to the positive going portions of signals 146 and 148, developed across resistor 38, and produces as an output signal only 2 pulses 152 and 154.

The two output pulses 152 and 154 are the pulses representing dropouts which would be visible to the viewer as distinct visible disturbances. Specifically, pulses 152 and 154 represent dropouts which, in the particular example described in this application, are greater than 5 microseconds duration, which represent a signal loss of between 12 db and20 db or greater and which must occur at least at 50-millisecond intervals.

The output from the one-shot multivibrator 40 is also applied to an emitter-follower 42 and to an amplifier 44 which operates as a pulse shaper and amplifier for the pulses from the one-shot multivibrator 40. The proper shaped and amplified pulses are then applied through a capacitor 46 which serves as a coupling capacitor. The capacitor 46, in combination with a second capacitor 48, operates as a capacitor-divider circuit. A pair of diodes 50 and 52 operates to insure a proper flow of current. A resistor 54 operates as a discharge resistor for the capacitor 48.

The charge on the capacitor 48 is applied to an integrating circuit which includes a resistor 56 and a capacitor 58 which operate as an RC charge circuit having a time constant determined by the values of the resistor 56 and the capacitor 58. An RC discharge circuit is provided by the capacitor 58 and a discharge resistor 60 and the time constant of the discharge circuit is in accordance with the values of the capacitor 58 and the resistor 60. Specifically, the RC time constant of the charge circuit is designed to be approximately twice the time constant of the discharge circuit and the time constant of the discharge circuit is chosen to be approximately one minute from the maximum charge level across the capacitor 58 to the minimum charge level. This discharge time determines the desired unit time over which the average number of dropout pulses is to be measured.

The output from the integrating circuit is, therefore, across the capacitor 58 and is applied to a pair of field-effect transistors 62 and 64 connected as a differential amplifier which include associated bias resistors 66, 68, 70, 72, 78 and potentiometers 74 and 76. In this embodiment, the field-effect transistor 62 is operated along the non-linear portion of its transfer characteristic curve. In this manner, the exponential characteristic of the capacitor 58 can be compensated such that the output from the differential amplifier formed from field-effect transistors 62 and 64 is substantially linear over the desired portion of the charging characteristic curve of capacitor 58 to be utilized. Potentiometer 74 permits adjusting of the operating characteristics of field-effect transistor 62 to obtain the desired compensation. Potentiometer 76 is used to balance the differential amplifier at zero input voltage.

The output from the differential amplifier formed from field-effect transistors 62 and 64 is applied to a meter movement 80 which is a part of a chart recorder. Specifically, the meter movement 80 controls the position of a pen in the chart recorder in a known manner so as to produce an output recording of the variable charge level on the capacitor 58, which charge level represents an average number of dropout pulses occurring in the unit time, which unit time is determined by the discharge time from the maximum charge level to the minimum charge level for the capacitor 58. A rheostat 82 may be used to calibrate the sensitivity of the meter movement 80 and the chart recorder so that the output indication may reflect the proper level response to the average number of dropout pulses per unit time. In one application, the range of dropouts to be averaged varied from 0 to 50 dropouts over a one-minute interval.

The present invention, therefore, provides for a moving minute dropout counter which records on an instantaneous and continuous basis the average number of dropout pulses occurring in video signals which average number is related to a unit time and which unit time is constantly moving so that the output record is continuous. The invention has been described with reference to a particular embodiment, but it is to be appreciated that various adaptations and modifications may be made and that the invention is only to be limited by the appended claims.

What is claimed is:

1. Apparatus for measuring an average number of dropout pulses occurring in a predetermined unit time within information signals recorded on a recording medium, said apparatus including
- first means operatively coupled to the recording medium for reproducing the information signals and any dropout pulses occurring therein,
- pulse generating means operatively coupled to the first means for producing from the dropout pulses intermediate pulses each having a particular amplitude and duration, and
- integrating means operatively coupled to the pulse generating means for storing a variable charge which is increased by a predetermined charge in response to each of the intermediate pulses and which is dissipated from a maximum charge level to a minimum charge level over a time interval equal to the predetermined unit time said integrating means continuously operating over a total period of time which is greater than said unit time so that said variable charge is related to the average number of dropout pulses occurring per unit time.

2. The apparatus of claim 1 and including additional means operatively coupled to the integrating means for recording a graphic record of the variable charge level representing the average number of dropout pulses occurring in the predetermined unit time.

3. The apparatus of claim 1 wherein the integrating means is a capacitive circuit having a discharge time constant equal to the predetermined unit time.

4. The apparatus of claim 1 additionally including means operatively coupled to the pulse generating means for counting the absolute number of dropouts.

5. Apparatus for measuring an average number of dropout pulses occurring in a unit time within information signals recorded on a recording medium, said apparatus including
- first means operatively coupled to the recording medium for reproducing the information signals therefrom having superimposed thereon the dropout pulses,
- pulse generating means operatively coupled to the first means for deriving from the dropout pulses having signal losses which are greater than a predetermined level and durations longer than a predetermined value a series of intermediate pulses each having a particular amplitude and duration, and integrating means operatively coupled to the pulse generating means for storing a variable charge which is increased by a predetermined charge in response to each of the intermediate pulses and which is dissipated from a maximum charge level to a minimum charge level over a time interval equal to the unit time said integrating means continuously operating over a total period of time which is greater than said unit time so that said variable charge is related to the average number of dropout pulses occurring per unit time.

6. The apparatus of claim 5 and including additional means operatively coupled to the integrating means for recording on a chart the variable charge level.

7. The apparatus of claim 5 wherein the integrating means is a capacitive circuit.

8. Apparatus for measuring an average number of dropout pulses occurring in a unit time within video signals recorded on a recording medium wherein each dropout pulse to be measured has a signal loss which exceeds a predetermined level and duration which is greater than a predetermined value, said apparatus comprising transducing means for scanning the recording medium with a transducing head to reproduce the video signals therefrom having superimposed thereon the dropout pulses to be counted;

a pulse generating means operatively coupled to the reproducing means for deriving from the dropout pulses having signal losses which are greater than a predetermined level and durations longer than a predetermined value a series of intermediate pulses each having a particular amplitude and duration and a time interval therebetween equal to the time interval between each of said dropout pulses, integrating means operatively coupled to said pulse generating means for storing a variable charge which is increased by a predetermined charge in response to each of said intermediate pulses and which is dissipated over a discharge time interval and wherein said integrating means is capable of discharging from a maximum charge level to a minimum charge level over a time interval equal to said unit time said integrating means continuously operating over a total period of time which is greater than said unit time so that said variable charge is related to the average number of dropout pulses occurring per unit time, and recording means operatively coupled to said integrating means for recording on a chart the variable charge level representing as an average number the dropout pulses occurring in the unit time from said video signals recorded on said recording medium.

9. The apparatus of claim 8 wherein the integrating means is a capacitive circuit.

10. A method for measuring the average number of dropout pulses occurring in a predetermined unit time within information signals recorded on a recording medium, said method comprising the steps of reproducing from the recording medium the information signals having superimposed thereon said dropout pulses, producing from the dropout pulses intermediate pulses of a particular amplitude and duration, and integrating said intermediate pulses to establish a variable charge level which is increased by a predetermined charge in response to each of said intermediate pulses and which is dissipated over a discharge time interval from a maximum charge level to a minimum charge level over a time interval equal to said unit time said integration being continuous over a total period of time which is greater than said unit time so that said variable charge is related to the average number of dropout pulses occurring per unit time.

11. The method of claim 10 including the additional step of recording the variable charge level as a graphic record.

12. The method of claim 10 including the additional step of counting the number of intermediate pulses.

13. A method for measuring the average number of dropout pulses occurring in a unit time within information signals recorded on a recording medium, said method comprising the steps of reproducing from the recording medium the information signals having superimposed thereon said dropout pulses, deriving intermediate pulses of a particular amplitude and duration in response to each of said dropout pulses having a signal loss which exceeds a predetermined level and a duration which is greater than a predetermined value, and integrating said intermediate pulses to establish a variable charge level which is increased by a predetermined charge in response to each of said intermediate pulses and which is dissipated over a discharge time interval equal to said unit time said integration being continuous over a total period of time which is greater than said unit time so that said variable charge is related to the average number of dropout pulses occurring per unit time.

14. The method of claim 13 including the additional step of recording said variable charge level on a strip member so as to represent as an average the dropout pulses occurring in said unit time from said signals recorded on said recording medium.

15. A method for measuring the average number of dropout pulses occurring in a unit time within video signals recorded on a recording medium wherein each dropout pulse to be measured has a signal loss which exceeds a predetermined level and a duration which is greater than a predetermined value, said method comprising the steps of scanning the recording medium with a reproducing head to reproduce therefrom the video signals having superimposed thereon the dropout pulses, deriving with a pulse generator intermediate pulses of a particular amplitude and duration in response to each of the dropout pulses having a signal loss which exceeds the predetermined level and a duration which is greater than the predetermined value, integrating said intermediate pulses to establish a variable charge level which is increased by a predetermined charge in response to each of said intermediate pulses and which is dissipated over a discharge time interval from a maximum charge level to a minimum charge level over a time interval equal to said unit time, said integration being continuous over a total period of time which is greater than said unit time so that said variable charge is related to the average number of dropout pulses occurring per unit time, and recording the variable charge level on a strip member so as to represent as an average the dropout pulses occurring in a unit time from said video signals recorded on said recording medium.

References Cited

UNITED STATES PATENTS

| | | | |
|---|---|---|---|
| 2,750,500 | 6/1956 | Aiken | 324—78 |
| 2,922,106 | 1/1960 | Oates et al. | 324—34 |
| 3,412,328 | 11/1968 | Lowery | 324—78 |
| 3,185,922 | 5/1965 | Wherry | 324—34 |

FOREIGN PATENTS

| | | |
|---|---|---|
| 1,066,472 | 4/1967 | Great Britain. |

RUDOLPH V. ROLINEC, Primary Examiner

R. J. CORCORAN, Assistant Examiner